July 12, 1966
W. D. SCHAEFFER
3,260,739
PRODUCTION OF VINYL ACETATE BY OXIDATION OF ETHYLENE WITH
A PALLADOUS SALT-CONTAINING CATALYST AND CATALYST
REGENERATION WITH OXYGEN AND A NITRITE OR
NITROGEN OXIDE
Filed Dec. 26, 1961
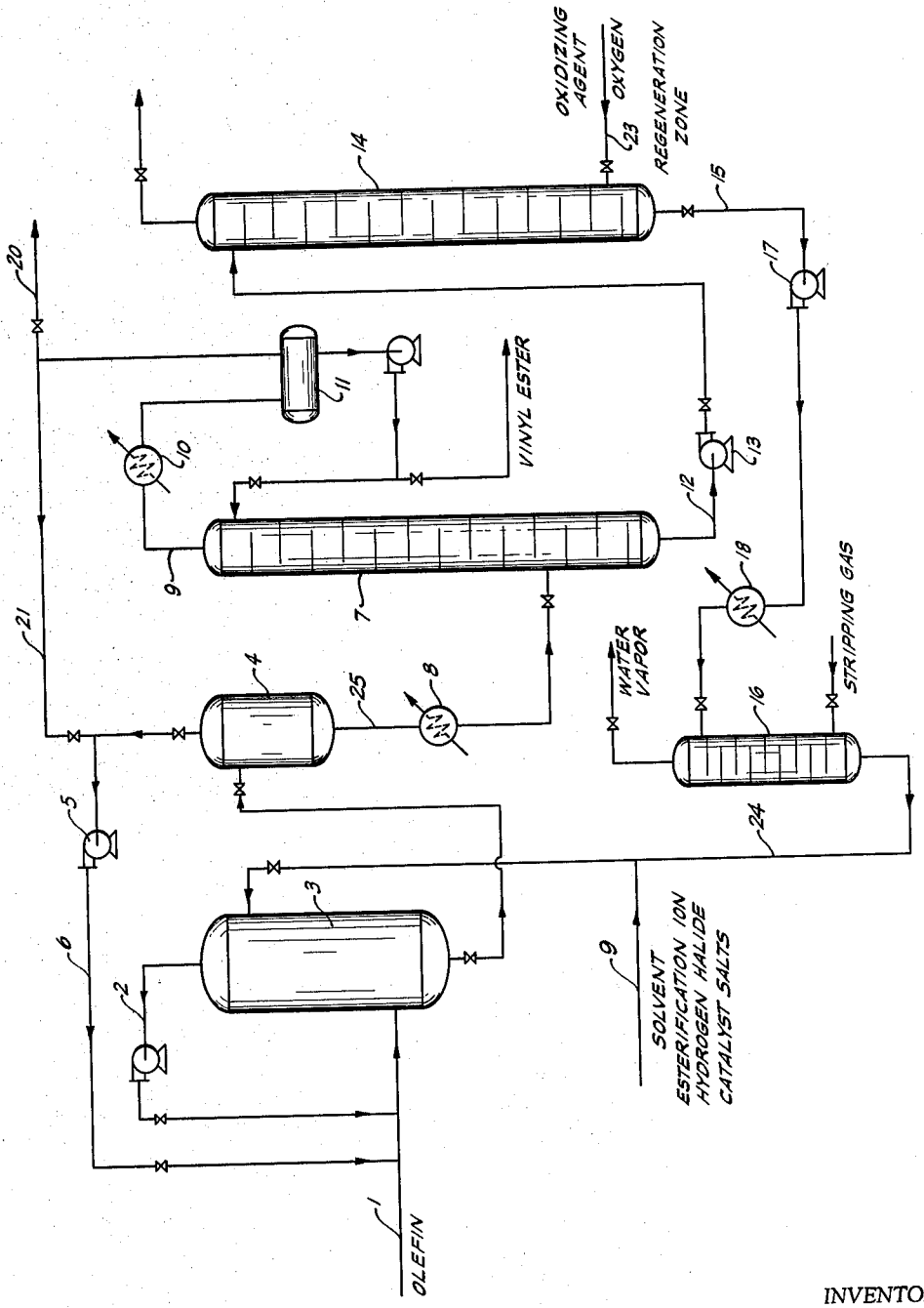
INVENTOR.
WILLIAM D. SCHAEFFER
BY
ATTORNEY United States Patent Office 3,260,739
Patented July 12, 1966

3,260,739
PRODUCTION OF VINYL ACETATE BY OXIDATION OF ETHYLENE WITH A PALLADOUS SALT-CONTAINING CATALYST AND CATALYST REGENERATION WITH OXYGEN AND A NITRITE OR NITROGEN OXIDE
William D. Schaeffer, Pomona, Calif., assignor to Union Oil Company of California, Los Angeles, Calif., a corporation of California
Filed Dec. 26, 1961, Ser. No. 161,932
2 Claims. (Cl. 260—497)

This invention relates to the esterification of hydrocarbon olefins and, in particular, to the esterification of ethylene to vinyl esters.

Recently, laboratory investigations have revealed that vinyl acetate can be manufactured from ethylene by reaction with sodium acetate in an acetic acid solution of palladium chloride. The reaction, which is believed to proceed through the formation of a pi-complex with the palladous ion and subsequent reaction with the acetate ion, results in the reduction of the palladous ion to metallic palladium. Thus, although the reaction proceeds quite smoothly and provides high yields of vinyl acetate, a stoichiometric quantity of palladium is reduced during the course of the reaction. To make this reaction commercially feasible, a method is needed to reoxidize the palladium in organic solvents. It is also desirable to increase the amount of vinyl ester yield to greater than that equivalent to the stoichiometric amount of palladous ion in solution.

It has been suggested that the palladous ion can be maintained by the presence of benzoquinone. While such a technique does, indeed, extend the usefulness of the palladous ion, the benzoquinone is reduced to hydroquinone or quinhydrone during the course of the reaction. Thereafter, the reduced benzoquinone cannot be readily reoxidized. The cost of the benzoquinone makes this approach unsatisfactory.

It is an object of this invention to provide a process for the production of vinyl esters.

It is a specific object of this invention to provide a method for the oxidation of the reduced form of the metal catalyst, particularly palladium, in organic solvents.

It is also an object of this invention to increase the yield of vinyl ester in the aforedescribed reaction to amounts in excess of the stoichiometric equivalent of the active metal catalyst, e.g., palladium in solution.

I have found that the effective life of the catalyst metal ion, preferably the palladous ion, in organic acid solutions can be greatly extended by the inclusion of various secondary metal ions, particularly the ferric and/or cupric ions preferably together with the proper concentration of a halogen ion. As used hereinafter, this solution (active catalyst ion, halide, secondary metal ions) is referred to as the catalyst solution.

I have also found that the catalyst ion in its reduced valence state is not readily oxidized in organic solvent. The inclusion of secondary metal ions in the solution facilitates this oxidation somewhat, permitting a direct oxidation with oxygen or air.

I have also found certain promoters, hereinafter described, greatly accelerate the oxidation of the reduced form of the catalyst metal, either in the presence or absence of the secondary metal ions.

The process will now be described by reference to the figure, wherein an olefin, typically ethylene, enters the process at 1 and is contacted with the catalyst solution in a suitable reaction zone 3 which can be a packed tower through which the olefin is passed upwardly countercurrent to the downward flow of the catalyst solution. More simply, the reaction zone can contain a liquid reservoir of catalyst into which the olefin is passed. Preferably, an excess of olefin is used, the excess being removed and recycled through line 2.

In general, reaction temperatures between about 25 and about 250° C. can be used, preferably between about 80 and about 150° C. The reaction pressure is sufficient to maintain the catalyst solution in liquid phase, generally between about 1 and about 15 atmospheres being sufficient. The reaction period, of course, depends on the rate of ethylene and inventory of catalyst metal ion, secondary metal ion, etc., in the solution. Generally, contacting times between a few minutes to about 2 hours can be used, the actual reaction time necessary being preferably determined by the rate of ethylene absorption by the solution; no adsorption or a very slight adsorption indicating that the solution is spent and must be regenerated. The ethylene absorption rate can of course be determined by observation of the reactor pressure or of the recycle flow of ethylene in a manner apparent to those skilled in the art.

The reactor effluent is passed to a suitable separator 4 and the pressure therein reduced to remove unreacted olefin which can be recycled by pump 5, line 6, to the olefin feed stream at 1. The catalyst solution containing the ester product passes through line 6 into distillation tower 7. When necessary, the liquid stream can be heated at 8 to effect the distillation. If desired, the reactor effluent can be flashed directly into tower 7. Distillation in tower 7 is performed to separate the ester product from the catalyst solution which contains the reduced form of the catalyst metal and cuprous and/or ferrous salts. Preferably, the solvent used in the process has a higher boiling point than the desired ester product and the ester can thus be recovered in the overhead from the distillation zone while the catalyst solution is recovered as the residue of the distillation. The overhead from the distillation tower passes through line 9 and cooler 10 and the resultant condensate passed into distillate drum 11. The distillate is withdrawn from this drum as ester product for further purification or treated as desired. The condensate is also used as reflux for the distillation tower in a conventional manner. The gas separated in drum 11 can be vented at 20 or the unreacted olefin contained therein recovered by recycle of the gas through line 21 to pump 5. Preferably, the product distillation is effected at atmospheric pressure, however, subatmospheric or superatmospheric pressures can be used if desired. Although separate vessels are illustrated for the reaction and product distillation zones, it is apparent that the vessel 7 can be superimposed onto reactor 3 or, more simply, the reaction could be performed in the lower portion of distillation tower 7. This technique would permit continuous removal of the ester product as it is formed. Excess ethylene could be recovered from the distillate drum 11 and recycled to the reaction.

The residue of the distillation passes by line 12, pump 13, to a regeneration zone 14 wherein the spent catalyst solution is caused to flow downwardly countercurrent to the upward flow of an oxygen-containing gas. If desired, batch processing could also be used in this step simply by accumulating a pool of spent catalyst in 14 and thereafter introducing the oxidant beneath the liquid level of the pool. Although, as previously mentioned, the presence of copper or iron salts in the catalyst solution permit the oxygen or air oxidation of the reduced catalyst metal, it is preferred to employ various oxidation promoters to accelerate the rate of oxidation. The regeneration can be conducted at temperatures between about 50° and about 250° C., preferably between about 100° and about 200° C.

Of the oxidation promoters, ozone, nitrogen oxides and hydrogen peroxide are preferred as they do not introduce extraneous materials into the solution. If desired, other strong oxidizing agents can be used such as manganic or cobaltic ions, bromide ions, chromate or dichromate ions. These oxidizing agents can be introduced into the solution as various organic or inorganic salts, e.g., cupric or ferric bromides; manganic or cobaltic halides, particularly chlorides or bromides, nitrates, manganic or cobaltic organic salts such as the acetates, butyrates, etc.; lithium chromates or dichromates, etc. The catalyst solution can thereafter be contacted with air or oxygen to effect the generation.

The nitrogen oxides, including nitric oxide, dinitrogen trioxide, nitrogen dioxide, dinitrogen tetraoxide, dinitrogen pentaoxide and nitrogen trioxide are preferred and are simply admixed with the oxygen containing gas supplied at 23. In general, between about $1 \times 10^{-6}$ and about $1 \times 10^{-1}$ parts of an oxidation promoter are employed per part by weight of solution; the bulk of the oxidation being performed by oxygen. With the preferred nitrogen oxides, between about $1 \times 10^{-6}$ and about $1 \times 10^{-2}$ parts of nitrogen oxide per part of solution are employed.

After the regenerative oxidation, the catalyst solution must be treated to remove the water formed during regeneration. Preferably, the water can be distilled off in the tower 14 by conducting the regeneration at temperatures above the vaporization temperature of water, or the regenerated solution can be passed to stripping vessel 16 wherein an inert stripping gas, e.g., air, carbon dioxide, nitrogen, etc., is employed to strip the water vapor from the solution. In some instances, it may be desirable to further heat the solution with heater 18 to effect the complete removal of water vapor from the solution. If desired, a suitable desiccant, e.g., carboxylic acid anhydrides such as acetic, propionic, butyric, valeric, benzoic, etc., can be added to effect the water removal. The regenerated catalyst solution is then passed through line 17 for introduction into the reactor. Makeup chemicals, e.g., solvents, organic acid salts, halides, etc., are added by line 19 to provide the desired catalyst formulation described in detail hereinafter.

Referring now to the olefinic compound to be esterified in accordance with my invention, any corresponding to the following structure can be employed:

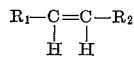

wherein $R_1$ and $R_2$ are hydrogen, aryl, e.g., phenyl, naphthyl, tolyl, etc., alkaryl, e.g., benzyl, p-cuminyl, etc.; alkyl, e.g., methyl, lauryl, isopropyl, etc. Examples of suitable olefins are: ethylene, propylene, butene, pentene, hexene, heptene, cyclohexene, indene, styrene, allyl benzene, etc. Reaction of ethylene yields the corresponding vinyl esters; propylene yields the isopropenyl esters and the 1-olefins yield products esterified at the 2-carbon. In general, any olefin may be employed that contains one or more hydrogens on the carbons bearing the double bond.

The ester group which is reacted with the olefin can be widely varied and is determined by the anion or anions present in the catalyst solution. Various organic anions can be added to the solution to serve as a source of esterifying anions, among which are the anions of the following carboxylic acids:

wherein R is selected from the following: hydrogen, alkyl, carboxyalkyl, aryl, alkaryl and carboxyaryl. Examples of such esterifying anions are: formate, acetate, propionate, butyrate, isobutyrate, valerate, isovalerate, caproate, isocaproate, caprylate, isocaprylate, benzoate, terephthalate, oxalate, malonate, succinate, glutarate, adipate, pimelate, suberate, azelate, sebacate, laurate, nitrobenzoate, toluate, naphthoate, etc. Examples of various products which can be obtained by my invention are: vinyl acetate, vinyl benzoate, vinyl naphthoate, divinyl terephthalate, divinyl oxalate, divinyl adipate, isopropenyl bendoate, diisopropenyl succinate, isopropenyl acetate, butenyl acetate, butenyl laurate, dibutenyl terephthalate, butenyl nitrobenzoate, pentenyl toluate, etc.

The aforementioned anions are added to the catalyst solution as soluble salts, in amounts comprising between about 0.5 and about 30, preferably between about 5 and about 15 weight percent of the solution. As used hereinafter, all weight percentages of the components in the catalyst solution are expressed on their ion basis, it being understood, of course, that the material is actually present in the system as an ion, as a dissolved salt, as a suspended salt, or even as the free metal (e.g., the catalyst metal in the spent solution). The anions are added to the solution as soluble salts of various metals such as the alkali metals; alkaline earth metals, e.g., calcium, magnesium, barium, etc. Cupric, ferric, manganic or cobaltic salts of the aforementioned anions can also be used. Of the aforementioned, the alkali metal salts, sodium, potassium, cesium, ribidium and lithium are preferred; lithium being the most preferred because of the high solubility of lithium salts in organic solvents.

The catalyst metal ion is included in the catalyst solution as a soluble salt, preferably as the halide, although the catalyst metal salt of any of the aforementioned esterifying ions can also be employed. Generally, however, the halides are preferred, and of the halides, the chloride is most preferred. Salts of any of the following metals, which are catalysts for the reaction, or admixtures thereof can be used: platinum, rodium, gold, ruthenium, vanadium, palladium and iridium. Of these metals, palladium is preferred because of its greater reactivity. Other metals, of course, can be preferred for other reasons; for instance, rhodium can be preferred because in its reduced state it exists as a soluble rhodious ion rather than as the free metal. As a result, it remains in solution, permitting facile regeneration. In general, between about 0.001 and about 5.0, preferably between about 0.001 and about 1.0 weight percent of the solution, comprises the catalyst metal ion.

Also included in the solution is a reservoir of secondary metal ions which serve to extend the effective life of the catalyst metal. These secondary metal ions are the cupric and ferric ions which are added as the halides, or other soluble salts, preferably as salts of the aforementioned esterifying ions, e.g., cupric acetate, ferric propanoate, cupric valerate, etc. Cupric is the preferred secondary metal ion because of its greater activity and solubility. In general, between about 1 and about 25, preferably between about 3 and about 15 weight percent of the solution comprises a cupric or ferric ion as a dissolved or suspended salt. The cupric or ferric salt can be used in excess of that soluble in the solution since I have found that even suspended salts are effective in reoxidizing the reduced form of the metal catalyst.

To provide an optimum oxidation-reduction energy balance which will permit the cupric or ferric ions to efficiently reoxidize the reduced form of the catalyst metal, it is desirable to incorporate a halide ion in the solution. This halide ion is preferably added as the salt of the aforedescribed cupric or ferric ions. It has been observed that excessive amounts of halide ions tend to inhibit the reaction of the catalyst ion with the olefin and, therefore, it is preferred to add only a portion of the cupric or ferric ion as the halide, the balance being added as the aforedescribed organic salts. In general, the halide ion comprises between about 0 and 10 percent, preferably between about 0.1 and about 5.0 percent of the catalyst solution.

The solvent for the system can be any suitable inert medium which has a high solubility for the aforementioned salts. Normal-, iso-, neo-, meso-, or cyclo-paraffins such as ethane, isopropane, butane, heptane, pentane, decane, cyclopropane, cyclopentane, cyclohexane, cyclooctane, etc., can be used as well as various aryl, alkaryls and their halogenated or nitrated derivatives, e.g., benzene, naphthalene, xylene, nitrobenzene, dichlorobenzene, toluene, etc. Various ethers, such as diisopropyl ether, dibutyl ether, diisoamyl ether, etc.; esters such as methyl formate, methyl acetate, propyl formate, ethyl propionate, propyl acetate, butyl formate, ethyl butyrate, amyl acetate, amyl butyrate, etc., nitrated paraffins, e.g., nitropropane, nitropentane, etc., can also be used as suitable organic solvents.

A second group of solvents which are preferred are the various organic acids of the esterifying ion. As examples are the saturated acids such as: acetic, propionic, butyric, isobutyric, valeric, isovaleric, caproic, caprylic, isocaprylic, enanthic, pelargonic, isopelargonic, capric, isocapric, adipic, lauric, etc. Various aromatic acids can also be used such as benzoic, toluic, nitrobenzoic, naphthoic, methyl naphthoic, etc. Preferably, the organic acid solvent is matched with the esterifying ion to avoid the production of a mixed product, e.g., acetic is used with an acetate salt such as lithium acetate, benzoic acid is used with potassium benzoate, etc. In one embodiment, the esterifying ion in the desired concentration can be obtained from the organic acid solvent by simply adding an alkali thereto, e.g., the addition of sodium or potassium hydroxide. The alkali is preferably added prior to dehydration of the solution in zone 16 so as to remove the water formed in neutralization.

Example 1

In this and following examples, a Parr hydrogenation apparatus was employed. The apparatus being filled with ethylene, the catalyst solution was added to the reaction flask and heated to the desired reaction temperature. The flask contents were evacuated and then a pressurized container of ethylene was opened to admit ethylene into contact with the solution. The flask was rocked to agitate its contents and the reaction temperature maintained by an infrared lamp. The decrease in ethylene pressure on the flask—affected by the rate of ethylene absorption—indicated the course of the reaction. After a steady pressure state had been reached, the flask was removed, its contents filtered and the filtrate fractionated to recover a crude unsaturated ester product, the identity of which was established by its physical properties.

The following catalyst solution was prepared:

| | Weight percent |
|---|---|
| Acetic acid solvent | 75.6 |
| $Pd^{++}$ (added as the chloride) | 0.35 |
| $Cu^{++}$ (added as the acetate) | 7.7 |
| $Li^+$ (added as the chloride) | 0.3 |
| $CH_3COO^-$ | 14.4 |
| $Cl^-$ | 1.7 |

Because the various salts were added in hydrated forms, the solution was dehydrated by distillation and recovering overhead a 36 milliliter fraction boiling between about 104° and 114° C. The reaction temperature was 60° C. and the ethylene pressure decreased from 30 to 24 p.s.i.g. during the reaction. Upon completion of the reaction, metallic palladium and cuprous chloride precipitate were found in the flask. The flask contents were distilled to yield 2.4 milliliters of a crude vinyl acetate-acetic acid mixture. Further fractionation of this product yields pure vinyl acetate.

Substantially the same results can be obtained when platinum, rhodium, gold or vanadium are substituted for the palladium in the aforedescribed experiment.

When the ethylene is replaced with propylene, the product obtained is isopropenyl acetate, with butene-1 the porduct is 1-butenyl 2-acetate, with pentene-2, the product is a mixture of 2-pentenyl 3-acetate and 2-pentenyl 2-acetate.

Example 2

The following solution was added to the reaction flask:

| | Weight percent |
|---|---|
| Acetic acid solvent | 83.0 |
| $Pd^{++}$ (added as the chloride) | 0.4 |
| $Cu^{++}$ (added as the acetate) | 4.2 |
| $Li^+$ (added as the acetate) | 0.5 |
| $CH_3COO^-$ | 11.6 |
| $Cl^-$ | 0.3 |

The solution was dehydrated by the addition of acetic anhydride. Upon addition of ethylene, a 1.5 p.s.i. drop in pressure occurred with a reduction of the palladious ion to metallic palladium. The cupric ion remained in the solution and was ineffective in reoxidizing the palladium metal under these conditions.

To the aforedescribed reaction media was then added 2 grams of lithium chloride to increase the chloride concentration to 1.3 weight percent. When the reaction flask was again pressurized with ethylene, a 2.5 p.s.i. pressure drop was noted, indicating that the added halide had increased the reactivity of the catalyst solution.

To the catalyst solution was thereafter added 20 grams of cupric chloride dihydrate, to increase the cupric and chloride ion concentration to 6.7 and 5.9 weight percent, respectively. The resultant solution, when pressurized with ethylene caused a 6 p.s.i. pressure drop. The reaction media was filtered and the filtrate distilled. Because the addition of the hydrated copper salt introduced water into the system, a major proportion of the overhead was acetaldehyde; however, about 1 milliliter of vinyl acetate was recovered.

The distillation residue was recombined with the cuprous salts and palladium recovered in the filtration step and oxygen was passed through the mixture for about one hour at reflux temperature to oxidize the cuprous to cupric and the metallic palladium to palladious ions.

The mixture was thereafter transferred to the reaction flask and a 6 p.s.i. pressure drop was noted upon pressurization with ethylene. A crude vinyl acetate product comprising 1.8 milliliters was recovered.

The spent catalyst solution containing metallic palladium and insoluble cuprous chloride was heated to reflux temperature and oxygen and sodium nitrite were introduced to reoxidize the metals. Two 0.25 gram portions of sodium nitrite were added and resulted in a very vigorous uptake of oxygen with rapid dissolution of the metallic palladium and cuprous salts.

Example 3

A three liter glass lined autoclave was charged with 2100 milliliters glacial acetic acid, 320 grams cupric acetate dihydrate, 27 grams lithium chloride and 10 grams palladium chloride. The autoclave contents were heated to distill a 260 milliliter overhead fraction boiling between 100° and 115° C. With the autoclave contents at 124° C., ethylene was slowly admitted to pressurize the system to 50 p.s.i.g. The temperature rose to about 145° C. within 15 minutes.

After one hour of stirring at 145° C., the autoclave was cooled and the pressure released. The liquid media which contained metallic palladium and insoluble cuprous salts was distilled in a 30-plate Oldershaw column to recover a 50 milliliter fraction boiling between 93° and 115° C. Refractive index analysis and subsequent distillation of this fraction confirmed the product to comprise about 16.6 milliliters of vinyl acetate. Based on the palladium present, the yield of vinyl acetate was 300 percent, indicating that the cupric ion was effective in reoxidizing palladium during the reaction.

The preceding examples are for illustration of my invention and are not to be construed as unduly limiting thereof; the necessary steps of my invention and their apparent equivalents are intended to be defined by the following claims.

I claim:

1. The manufacture of vinyl acetate which comprises contacting ethylene with an anhydrous catalyst solution at a temperature between about 25° and about 250° C. said solution comprising:

acetic acid solvent;
between about 0.001 and about 1.0 weight percent palladium ion;
between about 1 and about 25 weight percent cupric ion;
between about 0.1 and about 5 weight percent chloride ion; and
between about 0.5 and about 30 weight percent of acetate ion;

maintaing said contacting with ethylene until the adsorption of ethylene substantially ceases, discontinuing said contacting and recovering a crude product containing vinyl acetate and spent catalyst solution, treating said crude product to recover said vinyl acetate, regenerating asid spent catalyst solution by treatment with oxygen and a soluble nitrite or nitrogen oxide, dehydrating the regenerated solution and returning said regenerated solution to contact with ethylene.

2. The production of vinyl acetate from ethylene which comprises:

(1) contacting ethylene with an anhydrous acetic acid solution containing between about 0.001 and about 5.0 weight percent palladium as palladous ion, between about 1 and about 25 weight percent copper as cupric ion and between about 0.1 about 5.0 weight percent of a halide ion and from $1 \times 10^{-6}$ to $1 \times 10^{-1}$ parts by weight of a soluble nitrite salt, said contacting being effected at a temperature between about 25° and about 250° C. and at a pressure sufficient to maintain said solution in liquid phase;

(2) removing a solution containing vinyl acetate, acetic acid, reduced palladium metal and cuprous ion from step (1);

(3) removing said vinyl acetate from said solution by distillation;

(4) contacting the residue of said distillation with oxygen at a temperature between about 50° and 250° centigrade to oxidize said cuprous ion to cupric ion and said palladium metal to palladous ion;

(5) distilling the water formed in step (4) from said solution; and (6) returning said solution to contact with ethylene.

References Cited by the Examiner

UNITED STATES PATENTS

| 1,951,747 | 3/1934 | Brezinski et al. | 260—497 |
|---|---|---|---|
| 2,428,590 | 10/1947 | Shokal et al. | 260—497 |
| 2,739,169 | 3/1956 | Hagemeyer | 260—497 |
| 2,879,232 | 3/1959 | Malo et al. | 252—416 |
| 3,080,425 | 3/1963 | Smidt | 260—586 |
| 3,086,994 | 4/1963 | Smidt | 260—597 |

FOREIGN PATENTS 137,511   4/1961   U.S.S.R.

OTHER REFERENCES

Moiseev, Diklady Alkademii Nauk U.S.S.R., vol. 133, pp. 377–380 (July 1960).

LORRAINE A. WEINBERGER, *Primary Examiner.*

ABRAHAM WINKELSTEIN, LEON ZITVER,
*Examiners.*

A. E. TANENHOLTZ, D. P. CLARKE, B. M. EISEN, V. GARNER, *Assistant Examiners.*